US008676760B2

(12) United States Patent
Shen et al.

(10) Patent No.: US 8,676,760 B2
(45) Date of Patent: Mar. 18, 2014

(54) MAINTAINING DATA INTEGRITY IN DATA SERVERS ACROSS DATA CENTERS

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/185,863

(22) Filed: Aug. 5, 2008

(65) Prior Publication Data

US 2010/0036885 A1 Feb. 11, 2010

(51) Int. Cl.
*G06F 17/30* (2006.01)

(52) U.S. Cl.
USPC .......................................... 707/640

(58) Field of Classification Search
USPC .......................................... 707/640
See application file for complete search history.

(56) References Cited

U.S. PATENT DOCUMENTS

| 5,596,716 | A | 1/1997 | Byers et al. |
| 5,748,652 | A | 5/1998 | Kim |
| 6,865,591 | B1 * | 3/2005 | Garg et al. ................. 709/201 |
| 7,472,143 | B2 * | 12/2008 | Enko et al. ................. 1/1 |
| 7,574,499 | B1 * | 8/2009 | Swildens et al. ........... 709/223 |
| 2003/0126197 | A1 * | 7/2003 | Black et al. ............... 709/203 |
| 2003/0158909 | A1 * | 8/2003 | Simpson et al. ........... 709/217 |
| 2003/0204509 | A1 * | 10/2003 | Dinker et al. .............. 707/100 |
| 2004/0010617 | A1 * | 1/2004 | Akahane et al. ........... 709/243 |
| 2004/0083213 | A1 * | 4/2004 | Wu et al. ................... 707/4 |
| 2004/0215628 | A1 * | 10/2004 | Kaczmarski et al. ...... 707/100 |
| 2004/0260972 | A1 * | 12/2004 | Ji et al. ...................... 714/11 |
| 2005/0154768 | A1 * | 7/2005 | Theimer et al. ........... 707/200 |
| 2005/0268145 | A1 * | 12/2005 | Hufferd et al. ............ 714/2 |
| 2006/0090095 | A1 | 4/2006 | Massa et al. |
| 2007/0288524 | A1 * | 12/2007 | Luick ........................ 707/200 |
| 2008/0256141 | A1 * | 10/2008 | Wayda et al. ............. 707/203 |
| 2008/0313496 | A1 * | 12/2008 | Prabhakaran et al. .... 714/15 |
| 2009/0307678 | A1 * | 12/2009 | Wu ............................ 717/168 |
| 2009/0327489 | A1 * | 12/2009 | Swildens et al. .......... 709/224 |

FOREIGN PATENT DOCUMENTS

| JP | 2003122509 A | 4/2003 |
| JP | 2004206562 A | 7/2004 |
| JP | 2005196683 A | 7/2005 |
| JP | 2006099495 A | 4/2006 |
| JP | 2006114040 A | 4/2006 |
| JP | 2006134323 A | 5/2006 |
| JP | 2006139477 A | 6/2006 |
| WO | 2008021636 A2 | 2/2008 |

* cited by examiner

*Primary Examiner* — Robert Beausoliel, Jr.
*Assistant Examiner* — Noosha Arjomandi
(74) *Attorney, Agent, or Firm* — Rabin & Berdo, P.C.

(57) ABSTRACT

A method, computer program product and system for maintaining data integrity of multiple copies of a piece of data in data servers of multiple data centers, includes maintaining a cluster of catalog servers, where one of the catalog servers is selected as the master catalog server, storing the piece of data in a primary data server chosen from the data servers, duplicating the piece of data to one or more backup data servers chosen from the data servers, recording a data state information to the master catalog server, duplicating the data state information to the cluster of catalog servers, and updating the data servers and the cluster of catalog servers when the primary data server fails.

15 Claims, 4 Drawing Sheets

MAINTAINING DATA INTEGRITY IN DATA SERVERS ACROSS DATA CENTERS

BACKGROUND

1. Technical Field

The present invention relates to data management in data centers. More specifically, it relates to maintaining the data integrity of multiple copies of data in the data servers of multiple data centers.

2. Background Information

A data center is a facility used to house computer systems and their associated components, such as telecommunications and storage systems. Almost all major enterprises have more than one data center, in which a huge amount of data is stored in the storage systems. Data centers provide the data, applications, web-hosting, and e-business functions that are essential for the continued operations of these enterprises. The data centers generally have redundant or backup power supplies, redundant data communications connections, environmental controls (e.g., air conditioning, fire suppression), and special security devices. They are dispersed in different geographical locations both for better disaster recovery and for the efficiency of geographical operations.

Most enterprises have multiple data centers. Some enterprises use passive-active data centers that have a copy of data in an active data center (i.e. the primary data center) while the other data centers containing the data (i.e. the backup data centers) are passive. This implementation of data centers usually wastes resources, because a disaster rarely happens to an active data center yet leaves its backup data centers intact. Other enterprises utilize active-active data centers in which both the primary and backup data centers are active. The active-active data centers are more complicated, but they are very efficient to service clients and improve server utilizations for normal operations. However, active-active data centers require reliable and consistent connections among data centers to keep data integrity and to control transaction flows. Otherwise, data in different data centers may not have necessary integrity, and the whole system will be malfunctioning. Moreover, it is usually very hard to maintain reliable and consistent connections across geographical locations where different data centers are located, so active-active data centers are currently used only for data that does not need strict transactions, and within an expensive dedicate Metrod network.

Many enterprises need active-active data centers for better scalability, higher reliability and more efficient use of resources. Good active-active data centers must be able to handle massive active replication copies of data, and to maintain data integrity and active role control when the network, a computer, or a component of a data center is down.

SUMMARY

A method, computer program product and system for maintaining data integrity of multiple copies of a piece of data in data servers of multiple data centers, includes maintaining a cluster of catalog servers, wherein one of the catalog servers is selected as the master catalog server, storing the piece of data in a primary data server chosen from the data servers, duplicating the piece of data to one or more backup data servers chosen from the data servers, recording a data state information to the master catalog server, duplicating the data state information to the cluster of catalog servers, and updating the data servers and the cluster of catalog servers when the primary data server fails.

DETAILED DESCRIPTION

Figure 1:
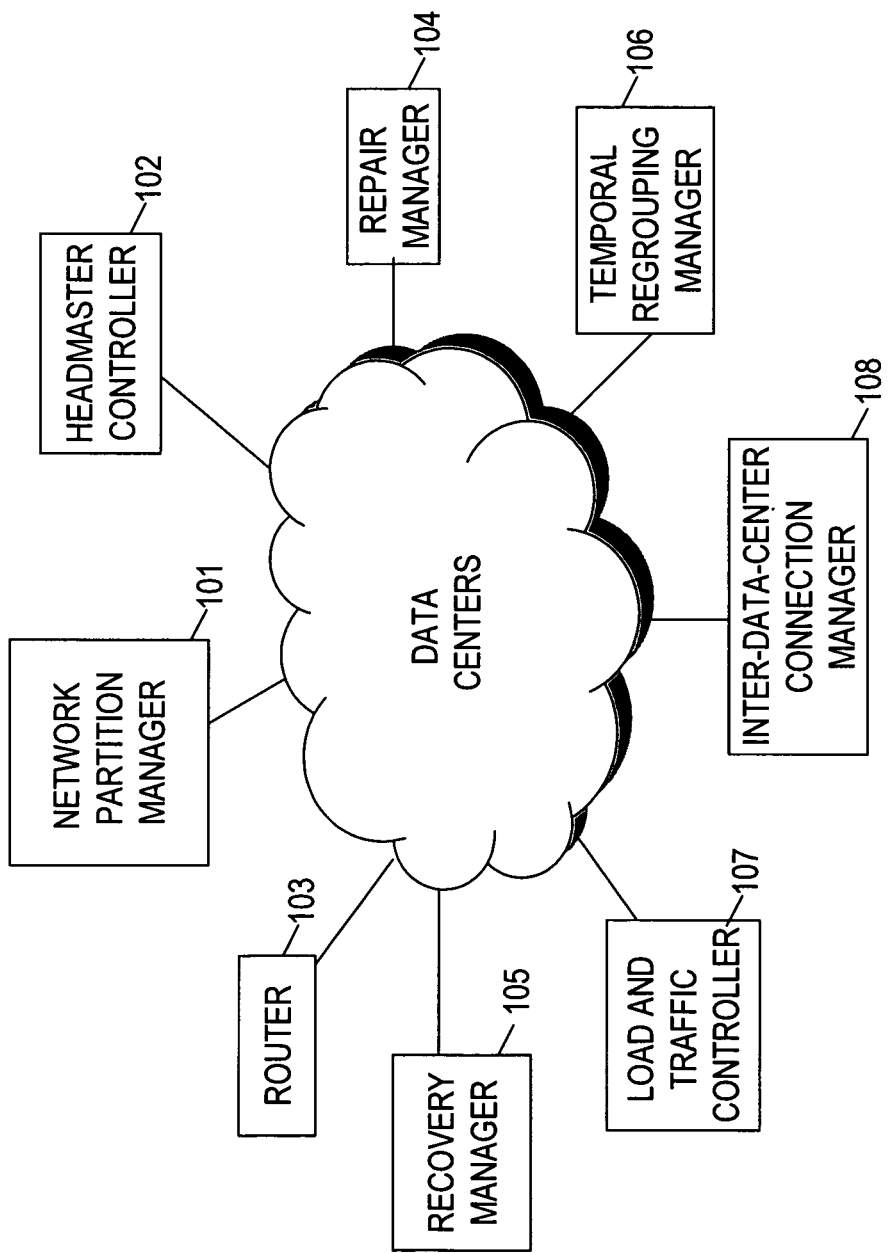
FIG. 1 is a block diagram of various components of the present invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following non-transitory media: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a transitory medium such as a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention enables active-active data centers in which there are no idle copies of data, and many copies of data can serve clients at the same time. Therefore, the present invention increases the utilization and scalability of the servers or the machines in the data centers, and reduces response time to a service request from a user.

In one embodiment of the present invention, a cluster of catalog servers, one of which is the master catalog server, is used to store the state information of the data, which are also replicated to many other servers in data centers across geographical locations. Each piece of data (e.g. a data table) is stored in its primary server, which is also known as the leader, and many (e.g. thousands of) replication servers. When the primary server fails, one of the data replication servers will be selected as the new primary server. Any server can be the primary server of some data and a replication server for other data, hence the workload and the roles of all servers can be balanced. A leader election mechanism is enabled to select one and only one leader at any moment for a piece of data. If an old leader fails, a new leader is selected immediately. The state information of the new leader is registered to the master catalog server and replicated to a cluster of catalog servers. A data-context-aware routing and forwarding system that depends on the roles of the servers is used to ensure any service request is routed to the closest server that has the correct data with the correct role (i.e. primary/replication).

In one embodiment of the present invention, as illustrated in FIG. 1, there are eight components: a network partition manager 101, a headmaster controller 102, a router 103, a repair manager 104, a recovery manager 105, a temporal regrouping manager 106, a load and traffic controller 107 and a inter-data-center connection manager 108.

The network partition manager 101 detects and manages disconnected network and initiates actions once a disconnection of the network is detected.

The headmaster controller 102 listens to the network partition manager 101, and controls the functions of data centers performed when the network is disconnected. For example, when data centers are divided into a majority group and a minority group by a malfunctioning component, the minority data center group cannot commit any transactions (i.e. transaction commit privilege will be removed) while keeping all non-dirty reads.

The router 103 will redirect all write transactions to the majority data center group, and it will compile dirty records.

The repair manager 104 spins a thread in each server of disconnected minority data centers, and attempts consistently to connect to the partitioned headmaster controller as scheduled (e.g. in every 10 seconds in the first 10 minutes, in one minute interval after first 10 minutes), so that the headmaster controller can remove the limitation of server functionality (e.g. committing write transactions).

The recovery manager 105 recovers all status and privileges of a server once the repair manager establishes a connection to the headmaster controller.

The temporal regrouping manager 106 pings each leader of each group. If a leader is not reachable, then it extracts all servers this unreachable leader manages. It then pings each member of the unreachable leader, and temporarily removes the servers that are not reachable.

The load and traffic controller 107 redirects traffic to other data centers for the disconnected data centers according to their service capability;

The inter-data-center connection manager 108 monitors connections between data centers.

The present invention enables active-active data centers that maintain massive active replication copies across data centers. For example, there could be 5000 replications active at the same time in the data centers. A data integrity and active role control mechanism is implemented to ensure these massive active replication copies are maintained and updated properly.

Figure 2:
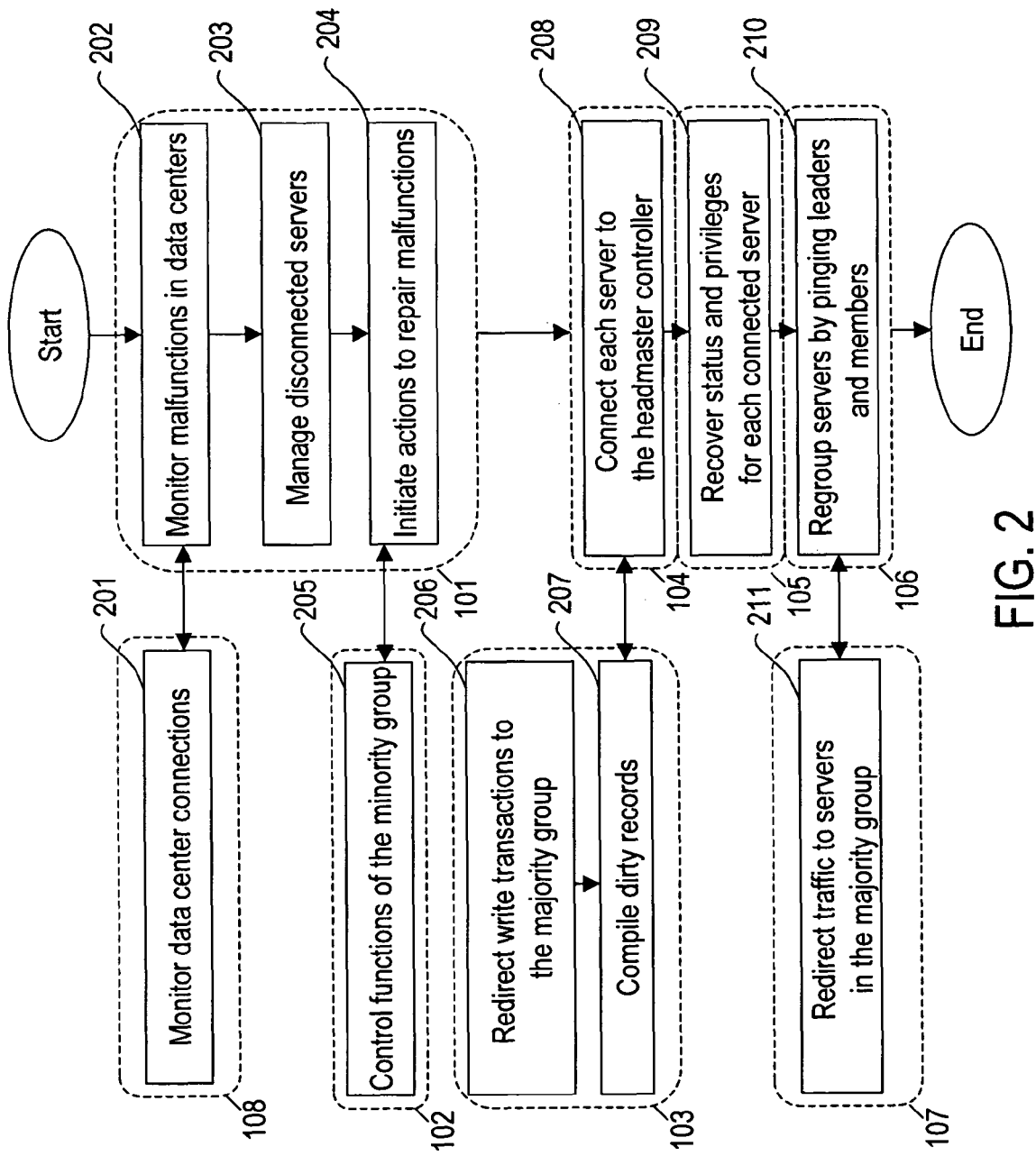
FIG. 2 is a block diagram that illustrates how the date integrity and active role control mechanism works.

FIG. 2 is a block diagram that illustrates how the date integrity and active role control mechanism works in one embodiment of the present invention. In a typical working mode, the inter-data-center connection manager 108 monitors connections between data centers (state 201), and the network partition manager 101 actively monitors networks for possible malfunctions (state 202). When a component of the data centers function abnormally, e.g. when a machine is down or a portion of the network works improperly, the network partition manager 101 manages the malfunctioning component of the data centers that are disconnected from the rest of the data centers (state 203), and initiates actions to repair the malfunctioning components (state 204). The malfunction component may divide the data center into two parts: a minority group and a majority group of servers in the data centers. In the repairing mode, the headmaster controller 102 receives malfunction information from the network partition manager 101, and controls the functions of the minority group (state 205). For example, it can revoke the transaction commit privilege of the data center in the minority group. All write transactions from the minority group of data servers are then redirected by the router 103 (state 206). The router 103 also compiles dirty records, which keeps the information of the data that has been written in the minority group (state 207). The repair manager 104 then makes attempts to connect the servers in the minority group to the headmaster controller 102, so as to identify the malfunctioning server, and remove it from the data centers (state 208). Once a connection is established between a server and the headmaster controller 102, all status and privileges will be recovered for the server by the recovery manager 105 (state 209). The temporal regrouping manager 106 then pings each leader of each group (state 210). If a leader is not reachable, all servers this unreachable leader manages will be extracted. It then pings each member of the unreachable leader, and temporarily removes the servers that are not reachable. If there are transactions accessing other data centers in the majority group, the load and traffic controller 107 will redirect the traffic to the respective data centers according to their service capability (state 211).

Figure 3:
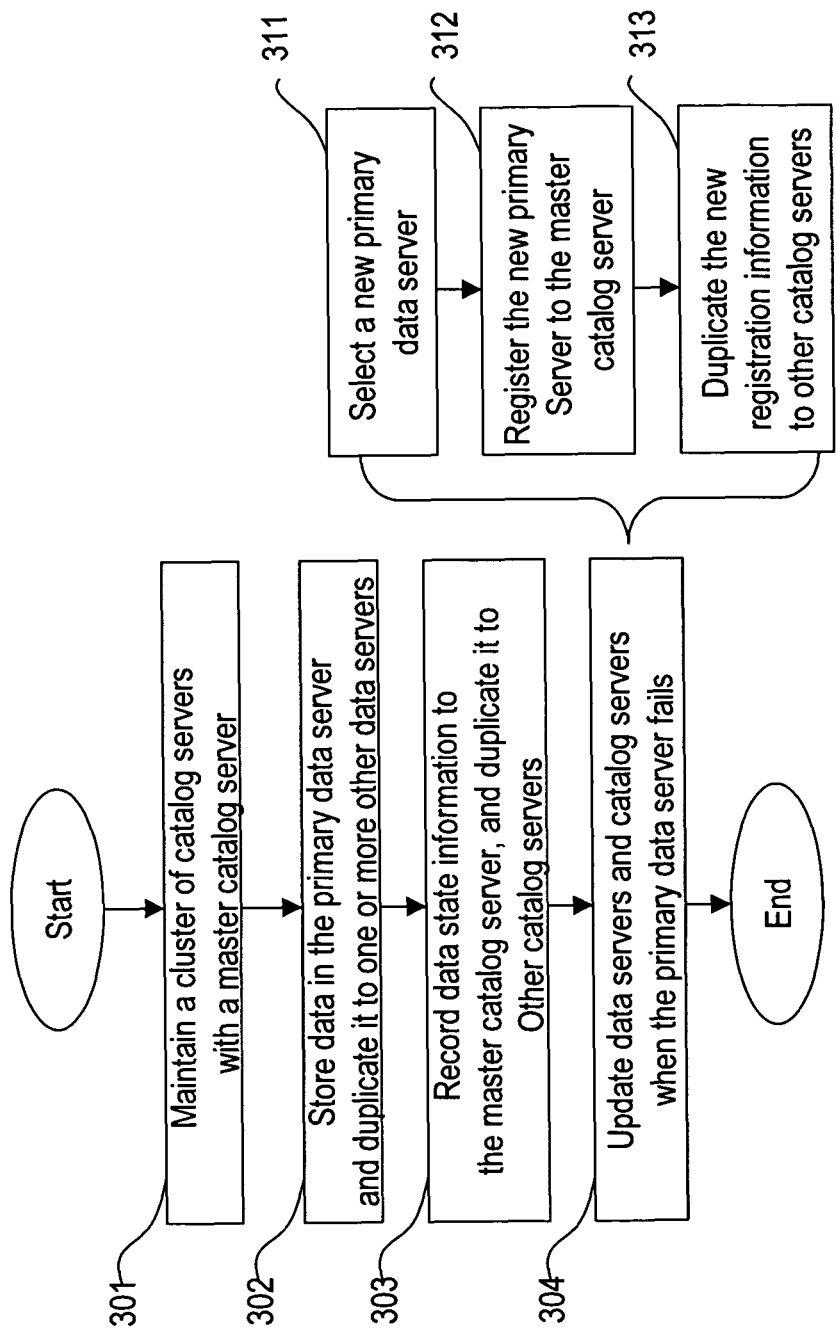
FIG. 3 is a flowchart that illustrates how the present invention maintains data integrity across data servers in multiple data centers.

FIG. 3 is a flowchart that illustrates how the present invention, in one embodiment, maintains data integrity across data servers in multiple data centers. In state 301, a cluster of catalog servers is maintained to keep the information of the data on the data servers, wherein one of the catalog servers is selected as the master catalog server. For a selected piece of data, a primary data server is picked. Different primary data servers can be chosen for different pieces of data (state 302). This piece of data is then duplicated to one or more backup data servers chosen from the data servers. In state 303, a data state information is recorded to the master catalog server, and then duplicated to the cluster of catalog servers. In case the primary data server fails, data servers and the cluster of catalog servers can be effectively updated in state 304. The update process includes three steps. First, a new primary data server is picked for a piece of data (state 311), and the information of this primary data server is registered to the master catalog server (state 312), and the registration information is then duplicated to one or more other catalog servers (state 313).

Figure 4:
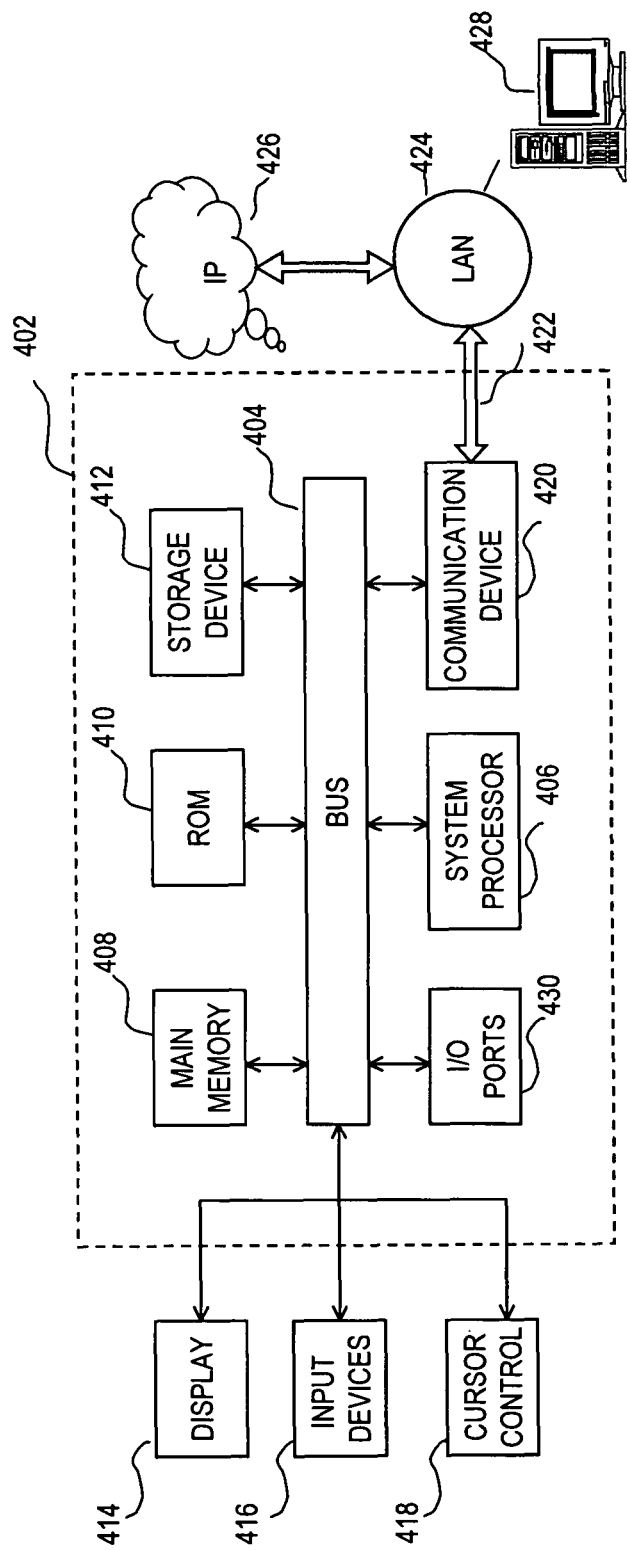
FIG. 4 is a conceptual diagram of a computer system in which the present invention can be utilized.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) (410) or other static storage device (e.g., programmable ROM (PROM), erasable PROM (EPROM), and electrically erasable PROM (EEPROM)) coupled to bus (404) for storing static information and instructions for processor. A storage device (412), such as a magnetic disk or optical disk, is provided and coupled to bus for storing information and instructions. This storage device is an example of a computer readable medium.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 3. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for maintaining data integrity of a plurality of copies of a piece of data, the plurality of copies being stored in a plurality of data servers across multiple data centers, comprising:

providing a plurality of active data servers to be the plurality of data servers, such that the plurality of copies stored therein are simultaneously accessible;

selecting one of the plurality of data servers to be a primary data server, storing the piece of data on the primary data server, and duplicating the piece of data to the other ones of the plurality of data servers;

maintaining a cluster of catalog servers, and designating one of the catalog servers to be a master catalog server;

recording data state information of the piece of data to the master catalog server, including registering the plurality of data servers that store the plurality of copies of the piece of data, and duplicating the data state information to the other catalog servers of the cluster of catalog servers; and routing each of a plurality of service requests for the piece of data either to the primary data server or to one of the other data servers that is closest to the service request, in accordance with the data state information of the piece of data, to thereby simultaneously access the copies of the piece of data on the plurality of data servers including the copy on the primary data server, wherein the routing includes selecting, using the recorded data state information, a closest one of the registered plurality of data servers and routing the service request to the selected data server.

2. The method of claim 1, wherein the updating comprises:

registering a new data state information containing the another one data server to the master catalog server; and duplicating the new data state information to other catalog servers in the cluster of catalog servers.

3. The method of claim 2, further comprising, before selecting the new primary data server, managing a majority group and a minority group of data servers disconnected by the failing primary data server;

controlling functions of data servers in the minority group;

compiling dirty records of data in the minority group of data servers;

removing the failing primary data server by connecting each server in the plurality of data servers to a headmaster controller; and regrouping the data servers connected to the headmaster controller.

4. The method of claim 1, wherein the plurality of data servers include more than two data servers, and said other data servers include at least two data servers of the plurality of data servers.

5. The method of claim 1, further comprising, responsive to a failure of the primary data server, selecting another one of the plurality of data servers to be the primary data server, and updating the duster of catalog servers.

6. A computer program product for maintaining data integrity of a plurality of copies of a piece of data, the plurality of copies being stored in a plurality of data servers that are active data servers across multiple data centers, and being simultaneously accessible, the computer program product comprising:

a non-transitory computer usable medium having computer usable program code embodied therewith, the computer usable program code comprising:

instructions to select one of the plurality of data servers to be a primary data server, to store the piece of data on the primary data server, and to duplicate the piece of data to the other ones of the plurality of data servers;

instructions to maintain a cluster of catalog servers, and to designate one of the catalog servers to be a master catalog server;

instructions to record data state information of the piece of data to the master catalog server, including instructions to register the plurality of data servers that store the plurality of copies of the piece of data, and to duplicate the data state information to the other catalog servers of the cluster of catalog servers; and instructions to route each of a plurality of service requests for the piece of data either to the primary data server or to one of the other data servers that is closest to the service request, in accordance with the data state information of the piece of data, to thereby simultaneously access the copies of the piece of data on the plurality of data servers including the copy on the primary data server, wherein the instructions to route include instructions to select, using the recorded data state information, a closest one of the registered plurality of data servers and to route the service request to the selected data server.

7. The computer program product of claim 6, wherein the instructions to update comprise:

instructions to register a new data state information containing the another one data server to the master catalog server; and instructions to duplicate the new data state information to other catalog servers in the cluster of catalog servers.

8. The computer program product of claim 7, further comprising, before instructions to select the new primary data server, instructions to manage a majority group and a minority group of data servers disconnected by the failing primary data server;

instructions to control functions of data servers in the minority group;

instructions to compile dirty records of data in the minority group of data servers;

instructions to remove the failing primary data server by connecting each server in the plurality of data servers to a headmaster controller; and instructions to regroup the data servers connected to the headmaster controller.

9. The computer program product of claim 6, wherein the plurality of data servers include more than two data servers, and said other data servers include at least two data servers of the plurality of data servers.

10. The computer program product of claim 6, further comprising instructions, responsive to a failure of the primary data server, to select another one of the plurality of data servers to be the primary data server, and to update the cluster of catalog servers.

11. A computer system comprising:
a processor;
a memory operatively coupled with the processor;
a storage device operatively coupled with the processor and the memory; and
a computer program product for maintaining data integrity of a plurality of copies of a piece of data, the plurality of copies being stored in a plurality of data servers that are active data servers across multiple data centers, and being simultaneously accessible, the computer program product comprising:

a non-transitory computer usable medium having computer usable program code embodied therewith, the computer usable program code comprising:

instructions to select one of the plurality of data servers to be a primary data server, to store the piece of data on the primary data server, and to duplicate the piece of data to the other ones of the plurality of data servers;

instructions to maintain a cluster of catalog servers, and to designate one of the catalog servers to be a master catalog server;

instructions to record data state information of the piece of data to the master catalog server, including instructions to register the plurality of data servers that store the plurality of copies of the piece of data, and to duplicate the data state information to the other catalog servers of the cluster of catalog servers; and instructions to route each of a plurality of service requests for the piece of data either to the primary data server or to one of the other data servers that is closest to the service request, in accordance with the data state information of the piece of data, to thereby simultaneously access the copies of the piece of data on the plurality of data servers including the copy on the primary data server, wherein the instructions to route include instructions to select, using the recorded data state information, a closest one of the registered plurality of data servers and to route the service request to the selected data server.

12. The computer system of claim 11, wherein the instructions to update comprise:

instructions to register a new data state information containing the another one data server to the master catalog server; and instructions to duplicate the new data state information to other catalog servers in the duster of catalog servers.

13. The computer system of claim 12, further comprising, before instructions to select the new primary data server, instructions to manage a majority group and a minority group of data servers disconnected by the failing primary data server;

instructions to control functions of data servers in the minority group;

instructions to compile dirty records of data in the minority group of data servers;

instructions to remove the failing primary data server by connecting each server in the plurality of data servers to a headmaster controller; and instructions to regroup the data servers connected to the headmaster controller.

14. The computer system of claim 11, wherein the plurality of data servers include more than two data servers, and said other data servers include at least two data servers of the plurality of data servers.

15. The computer system of claim 11, further comprising instructions, responsive to a failure of the primary data server, to select another one of the plurality of data servers to be the primary data server, and to update the cluster of catalog servers.

* * * * *